United States Patent
Mengwasser (10) Patent No.: US 12,267,912 B2
(45) Date of Patent: Apr. 1, 2025

(54) SYSTEMS AND METHODS FOR PROVIDING APPLICATIONS WITH ACCESS TO NETWORK FUNCTIONALITY

(71) Applicant: DISH Wireless L.L.C., Englewood, CO (US)

(72) Inventor: Brian Mengwasser, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 374 days.

(21) Appl. No.: 17/558,120

(22) Filed: Dec. 21, 2021

(65) Prior Publication Data

US 2023/0199472 A1   Jun. 22, 2023

(51) Int. Cl.
| | |
|---|---|
| H04W 8/18 | (2009.01) |
| H04W 4/029 | (2018.01) |
| H04W 4/24 | (2018.01) |
| H04W 28/02 | (2009.01) |
| H04W 48/18 | (2009.01) |

(52) U.S. Cl.
CPC ............ *H04W 8/18* (2013.01); *H04W 4/029* (2018.02); *H04W 4/24* (2013.01); *H04W 28/0268* (2013.01); *H04W 48/18* (2013.01)

(58) Field of Classification Search
CPC ......... H04W 8/18; H04W 4/029; H04W 4/24; H04W 28/0268; H04W 48/18
USPC .......................... 370/216, 221, 222, 223, 224
See application file for complete search history.

(56) References Cited

U.S. PATENT DOCUMENTS

| | | |
|---|---|---|
| 5,884,035 A | 3/1999 | Butman |
| 5,991,809 A | 11/1999 | Kriegsman |
| 6,823,355 B1 | 11/2004 | Novaes |
| 9,414,222 B1 | 8/2016 | Dixon |
| 10,547,521 B1 | 1/2020 | Roy et al. |
| 10,778,539 B1 | 9/2020 | Hussain et al. |
| 11,436,777 B1 | 9/2022 | Karli et al. |
| 2001/0032257 A1 | 10/2001 | Wells |

(Continued)

FOREIGN PATENT DOCUMENTS

| | | |
|---|---|---|
| EP | 3128473 A1 | 2/2017 |
| WO | 2008156898 A2 | 12/2008 |
| WO | WO 2020193394 A1 | 10/2020 |

OTHER PUBLICATIONS

International Search Report and Written Opinion, mailed May 26, 2023, for International Patent Application No. PCT/US2022/082046. (19 pages).

(Continued)

*Primary Examiner* — Obaidul Huq
(74) *Attorney, Agent, or Firm* — Seed IP Law Group LLP (57) ABSTRACT

An application marketplace system is able to provide applications to a device which cause the device's interaction with a network to change. The application marketplace system identifies a plurality of aspects of a network, each of which provide a type of network functionality for a device connected to the network. The application marketplace system receives user input indicating one or more aspects of the plurality of aspects of the network and user input indicating a device connected to the network. The application marketplace system generates an application for the device based on the user input and causes the application to be provided to the device. The generated application is able to change the device's interaction with the network.

18 Claims, 7 Drawing Sheets

(56) References Cited

U.S. PATENT DOCUMENTS

| | | |
|---|---|---|
| 2002/0083185 A1 | 6/2002 | Ruttenberg et al. |
| 2002/0120763 A1 | 8/2002 | Miloushev et al. |
| 2002/0161890 A1 | 10/2002 | Chen |
| 2002/0198991 A1 | 12/2002 | Gopalakrishnan et al. |
| 2003/0014478 A1 | 1/2003 | Noble |
| 2003/0033429 A1 | 2/2003 | Myoki |
| 2003/0037165 A1 | 2/2003 | Shinomiya |
| 2003/0099254 A1 | 5/2003 | Richter |
| 2003/0134631 A1 | 7/2003 | Snyder et al. |
| 2005/0038906 A1 | 2/2005 | Banes |
| 2005/0219564 A1 | 10/2005 | Arai |
| 2006/0182246 A1 | 8/2006 | Horie |
| 2007/0291773 A1 | 12/2007 | Khan |
| 2008/0141327 A1* | 6/2008 | Oh .................. H04N 21/435 725/131 |
| 2009/0210802 A1 | 12/2009 | Hawkins |
| 2012/0120816 A1 | 5/2012 | Garg |
| 2013/0078947 A1* | 3/2013 | Pecen ................ H04L 63/1458 455/411 |
| 2014/0181934 A1 | 6/2014 | Mayblum et al. |
| 2014/0201379 A1* | 7/2014 | Barzily .............. H04L 67/1001 709/228 |
| 2015/0094104 A1 | 4/2015 | Wilmhoff et al. |
| 2015/0173022 A1 | 6/2015 | Black et al. |
| 2016/0192151 A1 | 6/2016 | Marri Sridhar et al. |
| 2016/0198003 A1 | 7/2016 | Luft |
| 2017/0006135 A1 | 1/2017 | Siebel |
| 2017/0034023 A1 | 2/2017 | Nickolov |
| 2017/0188309 A1 | 6/2017 | Black et al. |
| 2018/0341394 A1 | 11/2018 | Sangli et al. |
| 2019/0141121 A1 | 5/2019 | Bernat |
| 2020/0296653 A1* | 9/2020 | Huang ................ H04W 40/00 |
| 2020/0313923 A1 | 10/2020 | Choudhary et al. |
| 2020/0382927 A1 | 12/2020 | Leduc et al. |
| 2020/0404069 A1 | 12/2020 | Li |
| 2020/0413217 A1 | 12/2020 | Rothschild |
| 2021/0006614 A1 | 1/2021 | Oyman |
| 2021/0105338 A1 | 4/2021 | Oyman |
| 2021/0329062 A1 | 10/2021 | Reisbick |
| 2022/0124469 A1 | 4/2022 | Liao |
| 2022/0132315 A1 | 4/2022 | Kolekar |
| 2022/0141662 A1 | 5/2022 | Liao |
| 2022/0141708 A1 | 5/2022 | Arrobo Vidal |
| 2022/0150794 A1 | 5/2022 | Sparks et al. |
| 2022/0182785 A1 | 6/2022 | Edge |
| 2022/0287038 A1 | 9/2022 | Singh |
| 2023/0247089 A1 | 8/2023 | Muttreja |
| 2023/0283691 A1 | 9/2023 | Kundu |
| 2023/0308853 A1 | 9/2023 | Ding |
| 2023/0396641 A1 | 12/2023 | Hebbagodi |

OTHER PUBLICATIONS

Invitation to Pay Additional Fees and, Where Applicable, Protest Fee; for International Application No. PCT/US2022/082046, mailed on Apr. 4, 2023, 13 pages.

International Search Report and Written Opinion, mailed Apr. 18, 2023, for International Patent Application No. PCT/US2023/060777. (14 pages).

International Search Report and Written Opinion, mailed Nov. 30, 2022, for International Patent Application No. PCT/US2022/042495. (16 pages).

"Smartscape: Interactive map visualizes dynamic relationships among all application components across every tier," https://www.dynatrace.com/platform/application-topology-discovery/smartscape/, retrieved Jun. 17, 2024. (8 pages).

Written Opinion of the International Searching Authority, file date Jan. 17, 2023, International Application No. PCT/US2023/060777. (7 pages).

* cited by examiner

SYSTEMS AND METHODS FOR PROVIDING APPLICATIONS WITH ACCESS TO NETWORK FUNCTIONALITY

BRIEF SUMMARY

Network subscribers and users (collectively "subscribers") have a variety of devices which are connected to, and interact with, a network, such as a regional network, national network, international network, telecom network, 5G/4G network, or other types of networks. Subscribers may additionally include software, hardware, applications, etc., in their devices in order to control the device's interaction with the network. However, subscribers do not have access to network functions and services (collectively "network functions") used to control a device's interaction with the network. Furthermore, subscribers are unable to manipulate, change, or otherwise influence, network functions to operate in a manner beneficial for their devices.

The embodiments disclosed herein address the issues above and thus help solve the above technical problems and improve the technology of network infrastructure by providing a technical solution that provides subscribers the ability to customize how their devices interact with the network and how the network interacts with their devices. Additionally, the embodiments disclosed herein include an application marketplace system which can recommend network features, identify errors, and assist in the creation of applications used to change how a device interacts with the network. Furthermore, the embodiments disclosed herein are able to be used provide a marketplace which can be used by multiple subscribers to obtain or distribute applications.

DETAILED DESCRIPTION

Subscribers typically have little to no access or control over the network functions and services which control their device's interaction with a network. The limited control subscribers may have is constrained to the subscribers ability to directly program their own devices, and they are unable to control the services and functions used by the network itself to provide service to their devices. Subscribers are additionally unable to affect how specific network functions and services are used by a network to interact with their devices.

The embodiments disclosed herein address the issues above and thus help solve the above technical problems and improve the technology of network infrastructure by providing a technical solution that provides subscribers the ability to customize how their devices interact with the network and how the network interacts with their devices. The embodiments disclosed herein are additionally able to be used to generate an application which can be applied to a device which changes the way the device interacts with a network. Furthermore, the embodiments disclosed herein are able to be used to operate a marketplace of applications to allow subscribers to use applications created by subscribers.

In some embodiments, the application marketplace system disclosed herein is able to identify a plurality of aspects of a network which are able to provide a type of functionality for a device; receive user input indicating one or more aspects of the plurality of aspects of the network; receive user input indicating a device connected to the network; generate an application for the device based on the user input indicating the one or more aspects; and provide the generated application to the device, such that the generated application changes the device's interaction with the network. In some embodiments, the network application marketplace system manages a network application marketplace which: receives an indication of an application generated by a first user based on user input indicating one or more aspects of a network and an indication of a device connected to the network, which is usable to change how the device interacts with the network; causes the application to be added to the network application marketplace; receives an indication of a device belonging to a second user being connected to the network; receiving an indication that the application is to be applied to the device; and applying the application to the device such that the application changes the device's interaction with the network. In some embodiments, a device receives an indication that an application included in a network application marketplace is to be applied to the device to change the device's interaction with the network; the device applies the application to itself; and the device uses the application to change the way the device interacts with the network.

In some embodiments, changing the device's interaction with the network comprises changing logical components of the network which are used by the identified device. The logical components of the network may be: data related to, residing in, or stored by, the network or network infrastructure components; models used by the network or by devices connected to the network, such as data models, analytical models, machine learning or AI models, etc.; one or more network functions; one or more network services; data services provided by the network; or other components of the network used by network infrastructure components or devices connected to the network. Changing the interaction with a logical component of the network may include changing the type of data exchanged between the device and the component, moving data related to the logical component to a certain location, such as a network infrastructure component which is closer to the geographic location of the device, changing the quality of service provided to the device, changing the priority of service provided to the device, or other changes in the interaction between a logical component of a network and a device.

In some embodiments, the marketplace application system obtains data regarding the quality of service provided to the device. The data regarding the quality of service provided to the device may be based on one or more of: the time that the device is connected to the network, the location of the devices while it is connected to the network, a data or service plan for the device, or other data related to the quality of service provided to a device. The data regarding the quality of service provided to the device may be displayed to a user. The data may be displayed by using an application marketplace user interface.

In some embodiments, the device's interaction with the network is changed based on one or more of: data received from a third party, data received from the device, data received from the network, etc. The network or the device may receive data from a third party, such as, for example, weather data describing a geographic location in which the device operates, data from government agencies regarding the operation of the device, data from government agencies regarding the geographic area in which the device operates, or other data obtainable from a third party. The network or device may receive data from onboard systems or functions of the device, such as data describing a geolocation of the device, diagnostic data describing the status of the device, audio data, visual data in the form of pictures or video, etc. The data received from a third party, the device, the network, etc., may trigger, be used by, etc., the application to change the device's interaction with the network.

In some embodiments, the device's interaction with the network is changed based on one or more data services provided by the network for the device. The data services may be related to one or more quality of service attributes for the device. The data services may be related to one or more functions of the device. At least one data service may be related to one function, but not related to another function of the device. The data services may be provided to the device by utilizing network slicing.

For example, the device may use one data service for navigation and another data service for identifying a location or item. The application may change the quality of service for the navigation service when the device enters a geographic area, such that the device receives a higher quality of service for that function, allowing the device to more accurately navigate within the area. The change in the quality of service may include changing one or more quality of service attributes attributed to the device, such as a change in bandwidth, network speed, data limits, etc. However, the identification service may not require additional network resources to be used in order to perform its function. Thus, the application ensures that only the quality of service for the navigation functionality of the device. As a result, the overall network usage of the device is raised to a smaller extent than if every function of the device received the new quality of service, regardless of whether the function actually needed the new quality of service.

In some embodiments, the user input identifying an aspect of the network may comprise user input identifying one or more network functions available to be used by the device. The user input may comprise computer code formatted in one or more programming languages, such as Java, C #, C, C++, ActionScript, JavaScript, etc. The application marketplace system may detect the network functions indicated by the user input, and suggest or recommend network functions to be used in the generated application based on one or more of: information describing the device, the network functions indicated by the user input, information describing the user's desired functionality for the device, and other information useful to recommend network functions to include in the generated application.

In some embodiments, the user input is parsed to determine whether at least one error exists in the user input. The user application marketplace system may indicate the at least one error to a user based on a determination that at least one error exists in the user input.

In some embodiments, the application marketplace system may determine whether the generated application will operate the device in the manner intended by the user. The application marketplace system may identify one or more functions of the generated application, based in part on the user input used to generate the application. The application marketplace system may receive one or more purposes for the application. The application marketplace system may determine whether the one or more functions, when the device executes the application, will perform the one or more purposes of the application. The application marketplace system may present the determination of whether the one or more functions will perform the one or more purposes of the application to a user.

In some embodiments, the application marketplace system analyzes billing data to determine whether the generated application will cause an increase in a user's bill when the device executes the application. The application marketplace system may identify one or more functions of the generated application. The application marketplace system may identify billing data, including one or more charges to the user account, for a user account associated with the device. The application marketplace system may determine whether the one or more functions of the generated application will cause a change to at least one charge of the one or more charges of the user account. The application marketplace system may indicate the change to the at least one charge to a user.

In some embodiments, the application marketplace system determines whether one or more existing network functions may also perform the one or more purposes of the application. The application marketplace system may suggest at least one existing network functions to a user based on a determination that one or more existing network functions performs the one or more purposes of the application. In some embodiments, the application marketplace system determines whether previously generated applications perform the one or more purposes of the application in a more desirable manner, such as a more efficient manner, a manner which results in a smaller change in the user's bills, etc. In some embodiments, the application marketplace system is able to cause the application to be applied to a second device, such that the application changes the second device's interaction with the network.

In some embodiments, the application marketplace system manages a network application marketplace usable to cause generated applications to be applied to devices to change the device's interaction with a network. The network application marketplace may allow a user which generated an application to specify a price which a second user must pay in order to apply the generated application to their device. The network application marketplace may recommend an application to a user based on usage data, a description of the type of application the user requires, a description of the purpose for the application, etc. The usage data may comprise one or more of: data describing the user's application usage history, metadata for the application, or other data related to the use of applications by devices operated by the user.

In some embodiments, a device connected to a network receives an indication that an application is to be applied by the device to change the device's interaction to the network. The application may require the device to utilize one or more network slices to change the device's interaction with the network.

In some embodiments, network applications can be integrated into other existing applications, thereby improving the ability of the existing application to interact with the network. For example, in such embodiments, a network application can be integrated into an existing fleet management application which monitors trucks, schedules maintenance, and updates customers on delivery timeframes. In such an example, the integration of the network application can allow the fleet management application to access additional functionality or information from the network, including the ability to control data rates and connectivity to a truck based on the truck's location and contents.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
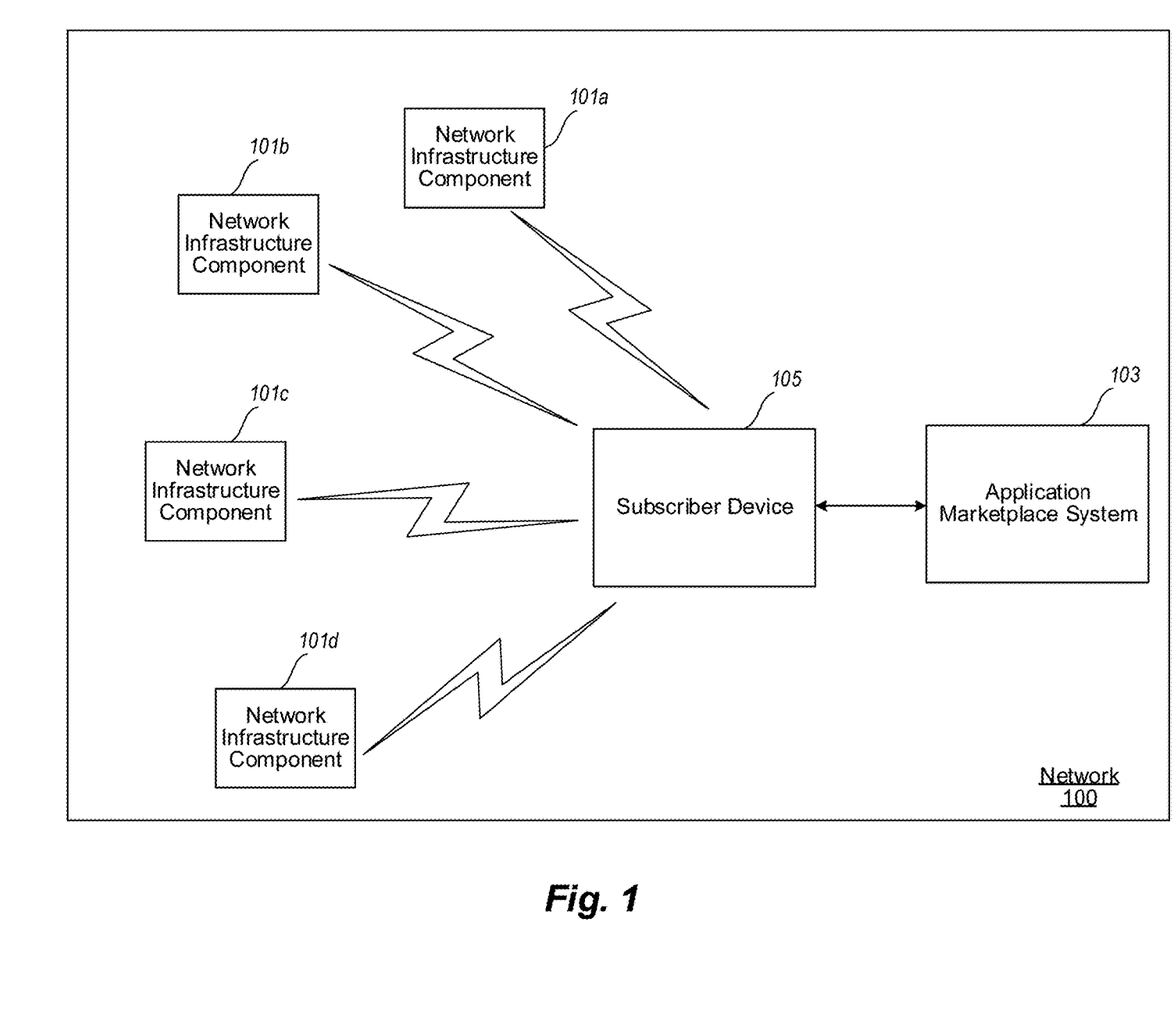
FIG. 1 is a diagram depicting an example environment in which an application marketplace system operates, according to various embodiments described herein.

FIG. 1 is a diagram depicting an example environment in which an application marketplace system operates, according to various embodiments described herein. It is to be appreciated that FIG. 1 illustrates just one example of a network 100 environment and that the various embodiments discussed herein are not limited to the use of such environment. The network 100 can include a variety of communication systems and can use a variety of communication devices, presentation devices and media including, but not limited to, media provided by satellite, cable, and Internet streaming services.

The network 100 is a network, communication system, or networked system (not shown), to which network infrastructure components 101a-101d, application marketplace system 103, subscriber device 105, and network functions (not shown), may be coupled, and on which the network infrastructure components 101a-101d (collectively "user devices 101"), application marketplace system 103, and subscriber device 105, operate. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, 5G networks, cable networks, or the like. The subscriber device 105 may be one or more endpoint devices, such as PCs, tablets, laptop computers, smartphones, personal assistants, drones, Internet connection devices, wireless LAN, WiFi, Worldwide Interoperability for Microwave Access (WiMax) devices, or the like, and may be communicatively coupled to the network and/or to each other so that the plurality of endpoint devices are communicatively coupled together. The network infrastructure components 101a-101d may be one or more towers, data centers, routers, network functions, network services, or other components, devices, or infrastructure, used to operate or manage a network, such as a 4G/5G network, cellular network, regional network, national network, etc. Thus, such a network enables the network infrastructure components 101a-101d, application marketplace system 103, subscriber device 105, and network functions (not shown), used as part of an application marketplace system, to communicate with each other.

Figure 2:
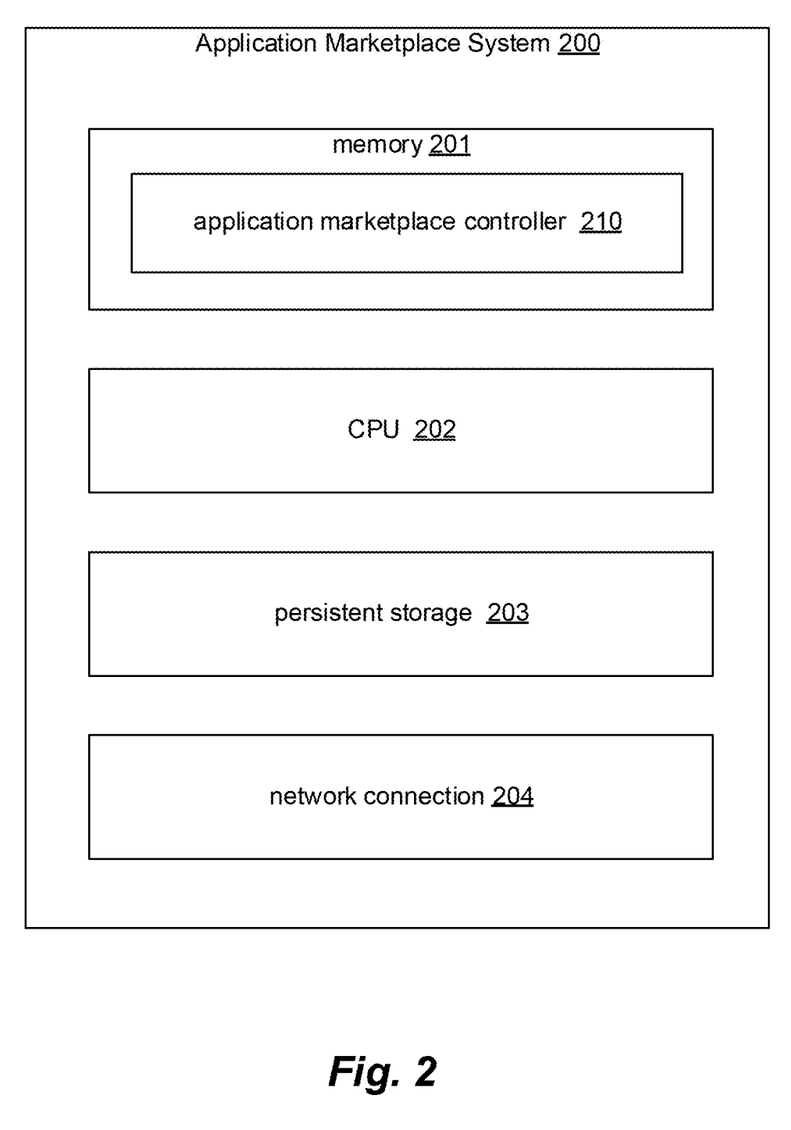
FIG. 2 is a block diagram depicting example components incorporated in an application marketplace system, according to various embodiments described herein.

FIG. 2 is a block diagram depicting example components incorporated in an application marketplace system 200, according to various embodiments described herein. The application marketplace system 200 may be: located on the network 100 in a position to communicate with one or more network infrastructure components, one or more subscriber devices, etc.; integrated as part of one or more network infrastructure components; integrated as part of a plurality of network infrastructure components; or portions of the application marketplace system may be integrated in a plurality of network infrastructure components. In various embodiments, the application marketplace system 200 includes one or more of the following: a computer memory 201 for storing programs and data while they are being used, including data associated with the various network infrastructure components 101, subscriber devices 105, and the application marketplace system 200, an operating system including a kernel, and device drivers; a central processing unit (CPU) 202 for executing computer programs; a persistent storage device 203, such as a hard drive or flash drive for persistently storing programs and data; and a network connection 204 for connecting to one or more network infrastructure components and/or other computer systems, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from network infrastructure components, and/or other network functions, and for connecting to one or more computer devices such as network infrastructure components, subscriber devices, and/or other computer systems. In various embodiments, the application marketplace system 200 additionally includes input and output devices, such as a keyboard, a mouse, display devices, etc.

While an application marketplace system 200 configured as described may be used in some embodiments, in various other embodiments, the application marketplace system 200 may be implemented using devices of various types and configurations, and having various components. The memory 201 may include an application marketplace controller 210 which contains computer-executable instructions that, when executed by the CPU 202, cause the application marketplace system 200 to perform the operations and functions described herein. For example, the programs referenced above, which may be stored in computer memory 201, may include or be comprised of such computer-executable instructions. The memory 201 may also include an application marketplace data structure which includes data used by the application marketplace system.

The application marketplace controller 210 performs the core functions of the application marketplace system 200, as discussed herein and also with respect to FIGS. 3 through 7. In particular, the application marketplace controller 210 is able to generate an application used to change a subscriber device's interaction with a network, and distribute that application to subscriber devices. Additionally, the application marketplace controller 210 may be used to operate a network application marketplace which allows subscribers to obtain previously generated applications for their devices. The application marketplace controller 210 may cause data related to subscriber devices, data related to applications used by subscriber devices, etc., to be displayed to a user.

In an example embodiment, the application marketplace controller 210 and/or computer-executable instructions stored on memory 201 of the application marketplace system 200 are implemented using standard programming techniques. For example, the application marketplace controller 210 and/or computer-executable instructions stored on memory 201 of the application marketplace system 200 may be implemented as a "native" executable running on CPU 202, along with one or more static or dynamic libraries. In other embodiments, the application marketplace controller 210 and/or computer-executable instructions stored on memory 201 of the application marketplace system 200 may be implemented as instructions processed by a virtual machine that executes as some other program.

In an example embodiment, the application marketplace system uses typical development processes to specify a network application. The process to specify the network app may include specifying the network application with regards to changes to the network, changes to a device's interaction with the network, etc. The application marketplace system may test the network application in various ways, such as by using a simulator. The network application marketplace may obtain data related to the network application, the device's performance after implementing the application, etc., such as by using a digital twin.

In some embodiments, the application marketplace system is able to manifest the processes used to specify, test, observe, etc., the network applications through an application programming interface (an "API"). The application marketplace system may manifest these processes as user interface elements in a customer portal or IDE. The application marketplace system may manifest these processes through a network application, for example, a digital twin may be able to monitor aspects of the device which are domain-centric, such as a healthcare digital twin to model devices in a hospital for HIPAA compliance.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the application marketplace system 200.

In addition, programming interfaces to the data stored as part of the application marketplace controller 210 can be available by standard mechanisms such as through C, C++, C #, Java, and web APIs; libraries for accessing files, databases, or other data repositories; through scripting languages such as JavaScript and VBScript; or through Web servers, FTP servers, or other types of servers providing access to stored data. The application marketplace controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the application marketplace system 200, user devices, and network infrastructure components.

Furthermore, in some embodiments, some or all of the components/portions of the application marketplace system controller 210, and/or functionality provided by the computer-executable instructions stored on memory 201 of the application marketplace system 200 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 3:
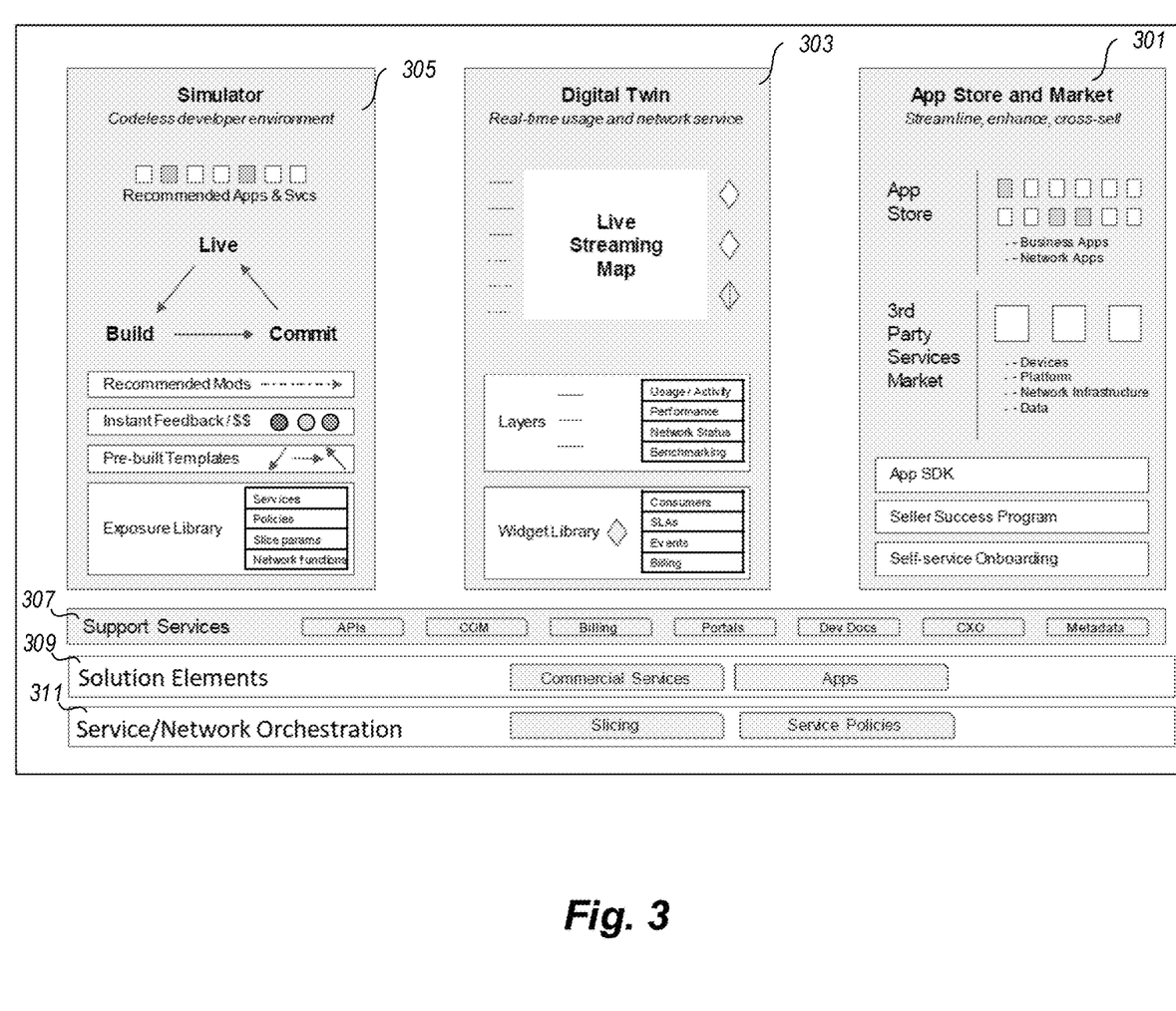
FIG. 3 is a display diagram depicting a display used by the application marketplace system, according to various embodiments described herein.

FIG. 3 is a display diagram depicting a display used by the application marketplace system, according to various embodiments described herein. The display may include an application store section 301, a digital twin section 303, a simulator section 305, a support section 307, a solution elements section 309, and a network orchestration section 311. The application store section 301 includes user interface elements usable to navigate and use an application store, and is further discussed in FIG. 4. The digital twin section 303 may be used by the application marketplace system to display data related to applications, devices, network infrastructure components, third party data, etc., which are of interest to the subscriber.

The simulator section 305 may be used by the application marketplace to provide a user interface for developing the application (a "simulator"). The simulator may be used to check the syntax for code used to define the application before the application, determine whether the application would be able to operate on the network or whether the change in the device's interaction with the network is possible, basic testing functions for the application, determining how the application may change the subscriber's network bills, suggesting or recommending functions or services provided by the network for the user, and other functionality related to developing an application which changes how a device interacts with a network.

The support services section 307 includes user interface elements which, when interacted with, allow a subscriber to use or view a variety of services which can be used to support the creation of applications. The support services included in the support services section 307 may include application programming interfaces (APIs), COM components, billing tools, portals, development documentation, metadata, and other tools and services which assist a subscriber in accessing network functions and services for use in an application. For example, the metadata may include data related to the usage of applications, the types of applications being created, metadata describing devices using an application, metadata describing devices making use of certain network functions or services, etc. The metadata may be used to recommend applications to a subscriber, suggest applications to be created by a subscriber, etc.

The solution elements section 309 includes user interface elements which, when interacted with, allow a subscriber to access applications and services accessible through the application marketplace system. The applications and services may include commercial services; applications developed by the network owner, such as data optimization applications, traffic applications, device identity applications, pricing applications, etc.; applications developed by a third party, such as applications for obtaining third party data, such as, for example, weather data describing a geographic location in which the device operates, data from government agencies regarding the operation of the device, data from government agencies regarding the geographic area in which the device operates, or other data obtainable from a third party; or other elements which may be included in a generated application.

The network orchestration section 311 includes user interface elements which, when interacted with, allow a subscriber to define service and network orchestration tools for their application. The service and network orchestration tools may include defining one or more service policies, which may affect the quality of service given to the device, providing network slicing services for the device, and other service and orchestration tools or techniques. The service policies may change the quality of service given to the device based on a variety of factors or triggers, such as, for example, certain data obtained by the device or network, a geographic location of the device, weather data describing the geographic location of the device, a predetermined amount of time the device is connected to the network, or other data or events which may be used to trigger a change in the quality of service for the device. The network slicing services may include providing a network slice for a device based on a variety of factors or triggers, such as the factors or triggers described above.

A subscriber may also specify a function of the device which should have its own network slice, quality of service attributes, or both, which are separate from the network slice, quality of service attributes, etc., provided to the other functions of the device. The application may operate to cause the specified function of the device to use the separate network slice, quality of service attributes, or both, based on a variety of factors or triggers, such as the factors or triggers described above. The application may operate to cause the specified function of the device to use the separate network slice, quality of service attributes, or both, by default.

Figure 4:
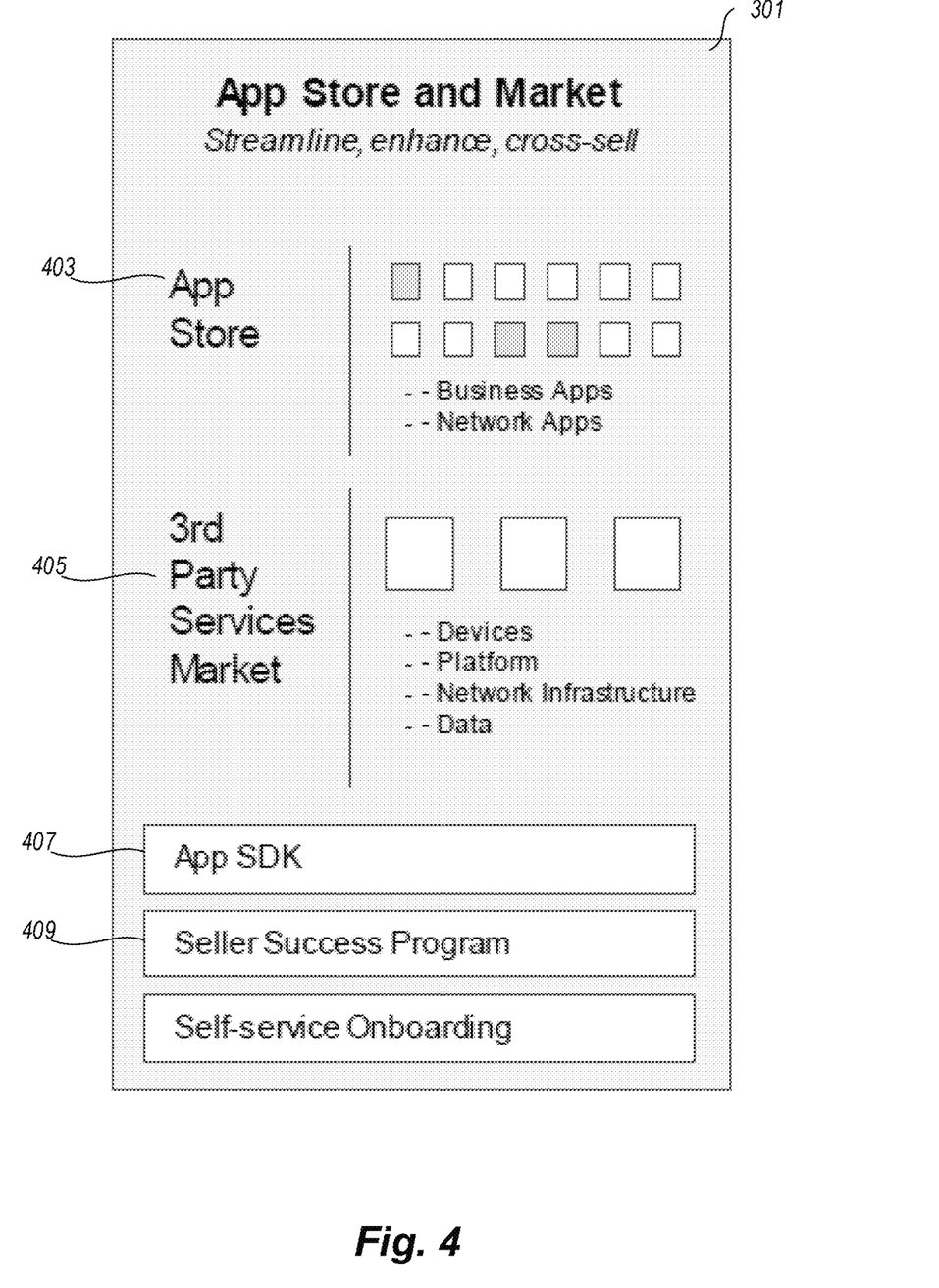
FIG. 4 is a display diagram depicting an application store section used by the application marketplace system, according to various embodiments described herein.

FIG. 4 is a display diagram depicting an application store section 301 used by the application marketplace system, according to various embodiments described herein. The application store section 301 includes an application store 403, a third party services market 405, an app software development kit (SDK) interface 407, a seller success program interface 409, and a self-service interface 411.

The application store 403 is an interface which allows a subscriber to obtain applications for their device. The application store 403 may additionally allow subscribers to purchase applications which have been created by other subscribers. Furthermore, a subscriber may upload their own applications to the application store 403 for other subscribers to use. The application store 403 may further be used to obtain and review feedback from users of the applications included in the application store 403.

The third party services market 405 is an interface which allows a subscriber to obtain services from third parties for use in their applications, by their devices, etc. The third party services may include services used to obtain data from a third party, services created by a third party to control or otherwise operate the subscriber device, or any other service or function which may be provided by a third party. The third party services market 405 may operate in a similar manner to the application store 403.

The app SDK interface 407 is an interface which allows a subscriber to access a software development kit used to create new applications for changing a device's interaction with a network. The seller success program interface 409 is an interface which allows a subscriber to create and capture metadata related to applications on the marketplace. The metadata may be used to suggest an application to create, recommend an application to a subscriber, etc. Thus, the metadata may be used to incentivize a subscriber to create more applications, better applications, etc.

Figure 5:
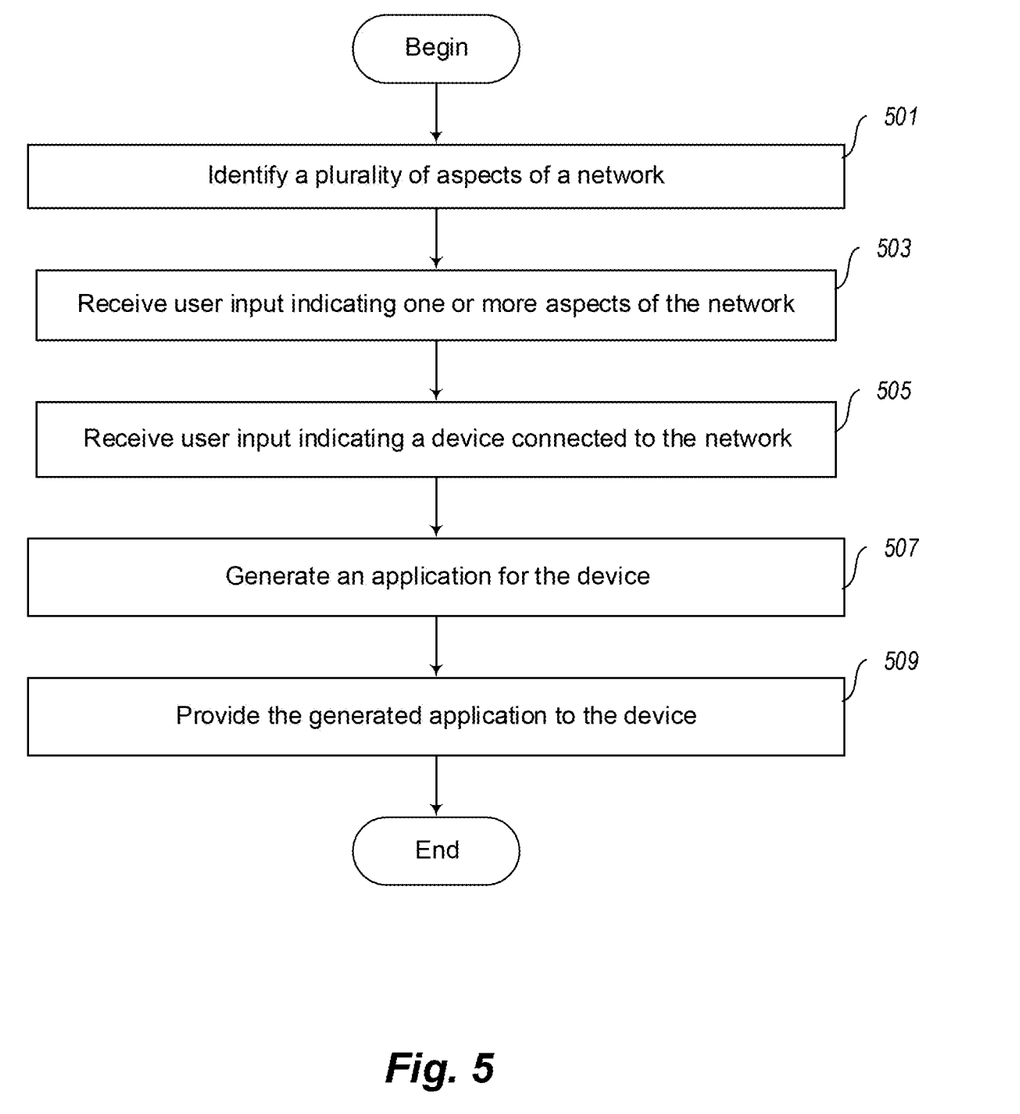
FIG. 5 is a flow diagram depicting a process to generate an application which changes a device's interaction with a network, according to various embodiments described herein.

FIG. 5 is a flow diagram depicting a process to generate an application which changes a device's interaction with a network, according to various embodiments described herein. At act 501, an application marketplace system identifies a plurality of aspects of the network. An aspect of the network may include network functions or network services provided to, provided for, performed for, etc., a device interacting with the network. Thus, an aspect may be used to provide a type of network functionality for the device.

At act 503, the application marketplace system receives user input indicating one or more aspects of the plurality of aspects. The user input indicating one or more aspects of the plurality of aspects may be received through an interface, such as the application SDK interface 407. At act 505, the application marketplace system receives user input indicating a device connected to the network.

At act 507, the application marketplace system generates an application for the device based on the indicated aspects and the indicated device. At act 509, the application marketplace system provides the generated application to the devices. The device may then use the generated application to change the way it interacts with the network. After act 509, the process ends.

Figure 6:
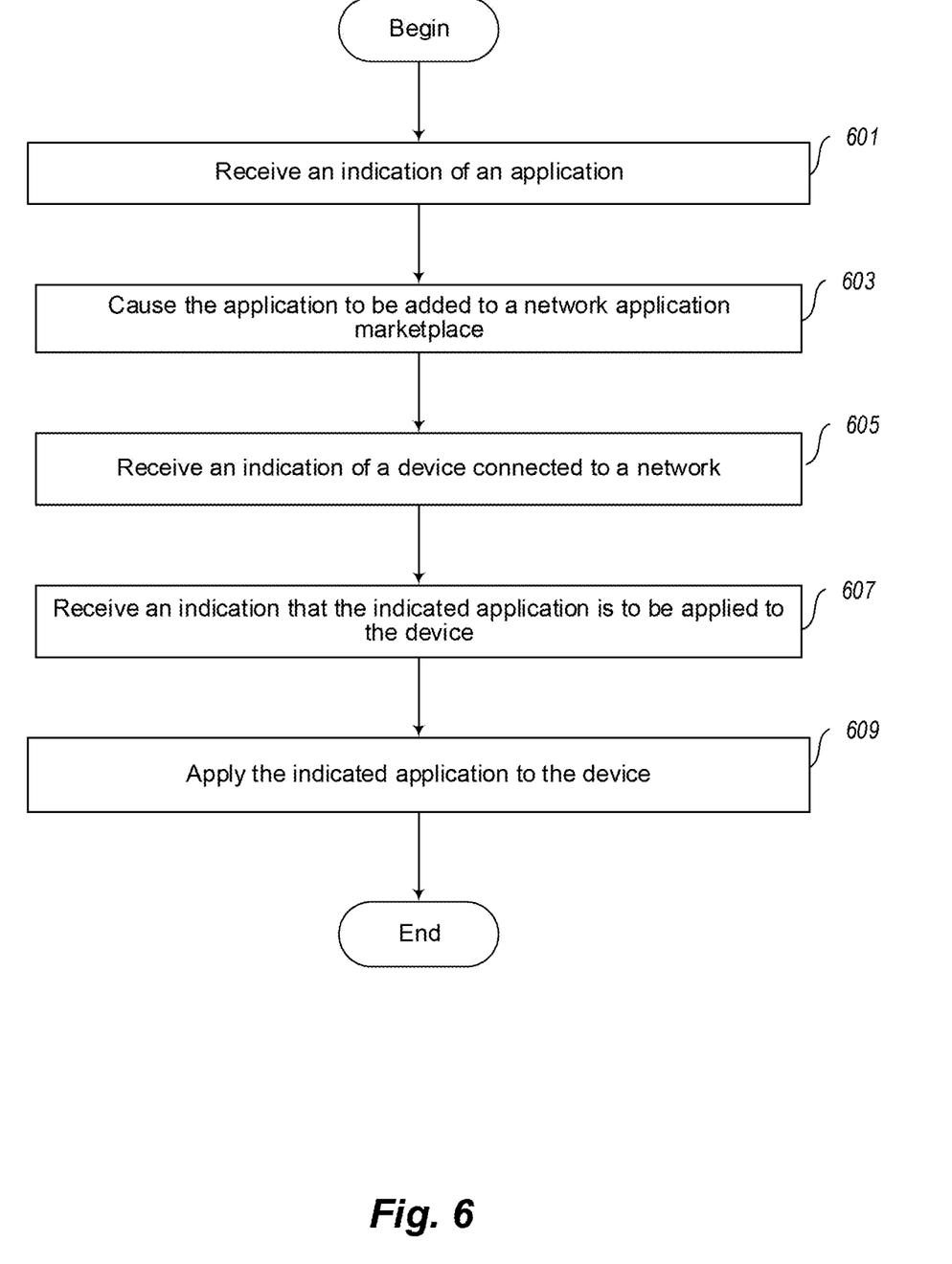
FIG. 6 is a process to use an application marketplace to apply an application to a subscriber device, according to various embodiments described herein.

FIG. 6 is a process to use an application marketplace to apply an application to a subscriber device, according to various embodiments described herein. At act 601, the application marketplace system receives an indication of an application which changes the way a device running the application interacts with a network. At act 603, the application marketplace system causes the application to be added to a network application marketplace.

At act 605, the application marketplace system receives an indication of a device connected to a network. At act 607, the application marketplace system receives an indication that the application is to be applied to the device. In some embodiments, the indicated device is owned by a subscriber other than the subscriber which originally created the application.

At act 609, the application marketplace system applies the indicated application to the device, such that the application is able to change the way the device interacts with the network. After act 609, the process ends.

Figure 7:
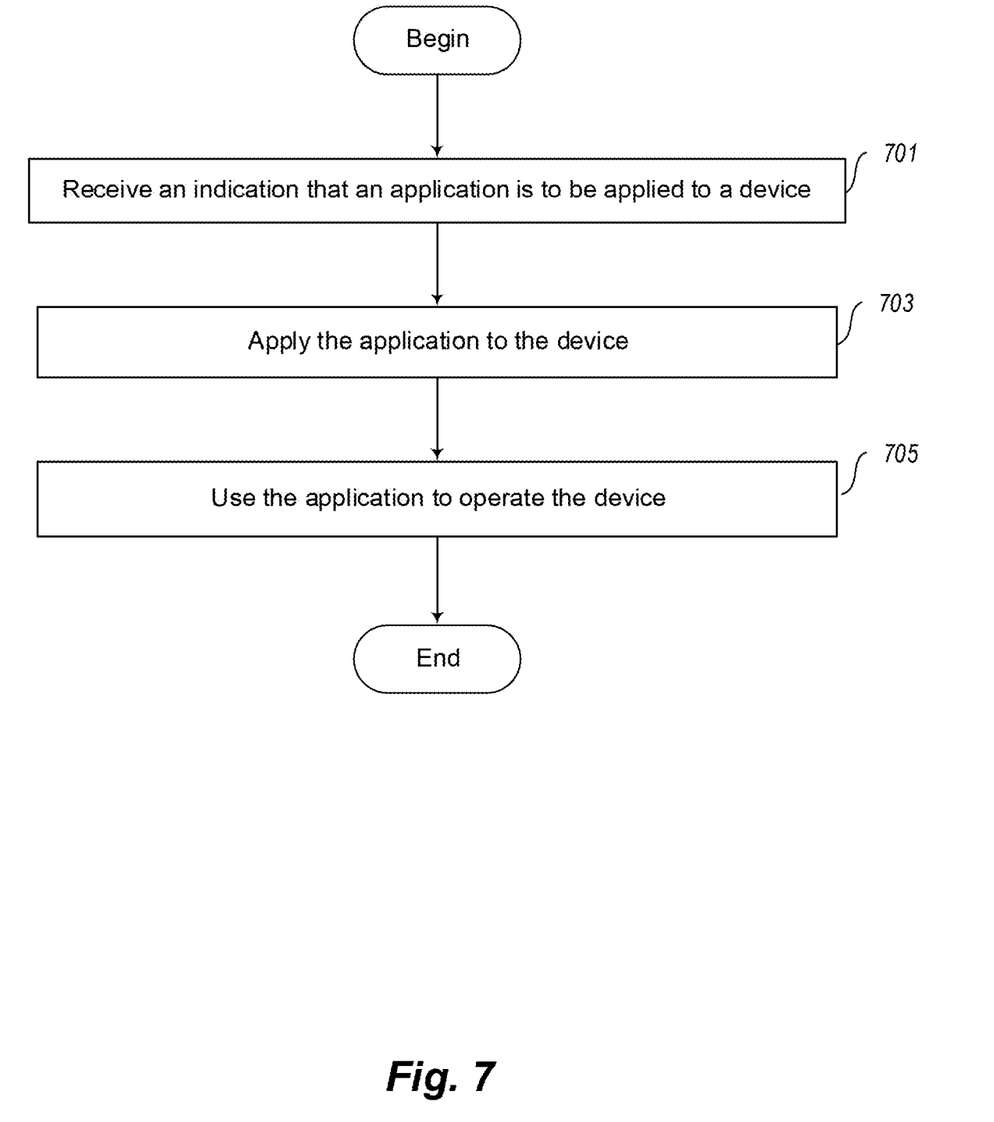
FIG. 7 is a process to apply an application to a device, according to various embodiments described herein.

FIG. 7 is a process to apply an application to a device, according to various embodiments described herein. At act 701, a subscriber device receives an indication that an application is to be applied to the device. The indication that the application is to be applied may be received from an application marketplace. At act 703, the subscriber devices applies the application to the device, such that the application can run on the subscriber device. At act 705, the subscriber device uses the applications to operate the device in such a manner that the device's interaction with a network is changed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
   at least one processor; and
   at least one memory coupled to the at least one processor, the memory having computer-executable instructions stored thereon that, when executed by the at least one processor, cause the system to perform:
   identifying a plurality of aspects of a wireless cellular telecommunication network, each aspect being able to provide a type of functionality for a device, wherein at least a portion of the aspects of the wireless cellular telecommunication network include one or more wireless cellular telecommunication network functions;
   receiving user input indicating one or more aspects of the plurality of aspects of the telecommunication network, wherein the user input indicates at least one wireless cellular telecommunication network function;
   receiving user input indicating a device connected to the wireless cellular telecommunication network;
   generating an application for the device based on the user input indicating the one or more aspects of the telecommunication network, the generated application being able to change the interaction of the identified device with the wireless telecommunication network based on the indicated wireless cellular telecommunication network function; and
   providing the generated application to the identified device, such that the execution of the application changes the interaction of the identified device with the wireless cellular telecommunication network based on the indicated wireless cellular telecommunication network function.

2. The system of claim 1, wherein changing the identified device's interaction with the wireless cellular telecommunication network further comprises:
   changing, by the generated application, logical components of the wireless cellular telecommunication network which are used by the identified device.

3. The system of claim 1, wherein the computer-executable instructions further cause the at least one processor to:
   obtain data regarding the quality of service provided to the device related to one or more of: the time the device is connected to the network or the location of the device while it is connected to the wireless cellular telecommunication network; and
   causing the data regarding the quality of service provided to the device to be displayed to a user.

4. The system of claim 1, wherein changing the identified device's interaction with the network further comprises:
   identifying data comprising one or more of: a location of the device or weather data describing a geographic location; and
   changing the identified device's interaction with the wireless cellular telecommunication network based on the identified data.

5. The system of claim 1, wherein changing the identified device's interaction with the network further comprises:
   identifying a plurality of data services for the device, each data service being related to one or more quality of service attributes provided by the wireless cellular telecommunication network; and
   changing the device's interaction with the wireless cellular telecommunication network based on the identified plurality of data services, wherein each data service of the plurality of data services is applied to one or more functions performed by the device.

6. The system of claim 1, wherein changing the identified device's interaction with the wireless cellular telecommunication network further comprises:
   identifying one or more services available to be provided to the device; and
   changing the identified device's interaction with the wireless cellular telecommunication network based on the identified one or more services.

7. The system of claim 6, wherein at least one service of the one or more services comprises a model used by the device.

8. The system of claim 1, wherein electronically receiving user input identifying one or more aspects of the wireless cellular telecommunication network further comprises:
   identifying one or more network functions available to be used by the device; and
   recommending a network function of the one or more network functions to a user based on at least information describing the device.

9. The system of claim 1, wherein electronically receiving user input identifying one or more aspects of the network further comprises:
   receiving at least a portion of the user input in the form of one or more programming languages;
   parsing the portion of the user input to determine whether at least one error exists in the user input; and
   based on a determination that at least one error exists in the user input, indicating to a user the at least one error.

10. The system of claim 1, wherein the computer-executable instructions further cause the at least one processor to:
    identify one or more functions of the generated application;
    receive, via user input, one or more purposes for the application;
    determine whether the one or more functions will perform the one or more purposes for the application; and
    based on a determination that the one or more functions will not perform at least one purpose of the one or more purposes for the application, indicate to a user that the one or more functions will not perform the at least one purpose.

11. The system of claim 1, wherein the computer-executable instructions further cause the at least one processor to:
    identify one or more functions of the generated application;
    identify billing data for a user account associated with the identified device, the billing data including one or more charges to the user account;
    determine whether the one or more functions will change at least one charge of the one or more charges to the user account; and
    based on a determination that the one or more functions will cause a change at least one charge of the one or more charges, indicate to a user that the one or more charges will cause a change to the at least one charge.

12. The system of claim 1, wherein the computer-executable instructions further cause the at least one processor to:
    identify one or more functions of the generated application;
    identify one or more existing network functionalities based on the one identified one or more aspects of the wireless cellular telecommunication network and the identified one or more functions of the generated application;
    determine whether the one or more functions operate in a more efficient manner than the one or more functions of the generated application; and
    based on a determination that the one or more functions will not operate in a more efficient manner than the one or more functions of the generated application, indicate to a user that the one or more functions will not operate in a more efficient manner than the one or more functions of the generated application.

13. The system of claim 1, wherein the computer-executable instructions further cause the at least one processor to:
    upload the generated application to a marketplace;
    receive an indication of a second device;
    receive an indication that the generated application is to be applied to the second device; and
    causing the generated application to be applied to the second device, such that the generated application is able to change the second device's interaction with the wireless cellular telecommunication network.

14. A method in a network application marketplace system which manages a network application marketplace, the method comprising:
    receiving an indication of an application, the application being generated by a first user based on user input indicating one or more aspects of a wireless cellular telecommunication network and user input indicating a device connected to the wireless cellular telecommunication network, the application being usable to change a device's interaction with the wireless cellular telecommunication network, wherein at least a portion of the aspects of the wireless cellular telecommunication network include one or more wireless cellular telecommunication network functions;
    causing the indicated application to be added to the network application marketplace, the network application marketplace including a plurality of applications;
    receiving an indication of a device connected to the wireless cellular telecommunication network, the device being associated with a second user;
    receiving an indication that the indicated application is to be applied to the device, the indicated application being able to change the interaction of the device with the wireless telecommunication network based on a wireless cellular telecommunication network function; and
    applying the indicated application to the device, such that execution of the application changes the device's interaction with the wireless cellular telecommunication network based on the indicated wireless cellular telecommunication network function.

15. The method of claim 14, wherein applying the indicated application to the device further comprises:
    receiving, from the first user, an indication of price for the application;
    receiving, from the second user, an indication that a price was paid to the first user for use of the application;
    determining whether the second user has submitted a payment to use the application based on the indication of the price for the application and the indication that the price was paid; and
    based on a determination that the second user has submitted payment to use the application, applying the indicated application to the device.

16. The method of claim 14, further comprising:
    receiving usage data describing one or more of: data describing the second user's application usage history or metadata for the indicated application;
    determining whether to recommend the indicated application or another application included in the network application marketplace system to the second user based on the usage data; and
    based on a determination that the indicated application should be recommended, indicating to the second user that the indicated application is recommended to be applied to the device.

17. A method in a device connected to a wireless cellular telecommunication network, the method comprising:
    receiving an indication that an application included in a network application marketplace is to be applied to the device, the application being usable to change the device's interaction with the at least one aspect of the wireless cellular telecommunication network, wherein the at least one aspect of the wireless cellular telecommunication network is a wireless cellular telecommunication network function;

applying the application to the device, the application being able to change the interaction of the device with the wireless cellular telecommunication network via a wireless cellular telecommunication network function indicated by the application; and using the application to operate the device, such that using the application by the device changes the interaction of the device with the wireless cellular telecommunication network via the wireless cellular telecommunication network function.

18. The method of claim 17, further comprising:

detecting that the application requires the use of a plurality of network slices;

operating the device, such that the device utilizes each of the plurality of network slices to interact with the wireless cellular telecommunications network.

\* \* \* \* \*